United States Patent
Mustafeez et al.

(10) Patent No.: US 9,046,648 B2
(45) Date of Patent: Jun. 2, 2015

(54) CONFOCAL AND CONCAVE 1D PHOTONIC CRYSTAL RESONANT CAVITIES WITH ULTRA-LOW MODE VOLUME

(71) Applicant: The Board of Trustees of the Leland Stanford Junior University, Palo Alto, CA (US)

(72) Inventors: Waqas Mustafeez, Hillsboro, OR (US); Alberto Salleo, San Francisco, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 14/180,774

(22) Filed: Feb. 14, 2014

(65) Prior Publication Data

US 2014/0270671 A1    Sep. 18, 2014

Related U.S. Application Data

(60) Provisional application No. 61/779,338, filed on Mar. 13, 2013.

(51) Int. Cl.
G02B 6/10 (2006.01)
G02B 6/122 (2006.01)
G02B 6/12 (2006.01)

(52) U.S. Cl.
CPC .... G02B 6/1225 (2013.01); *G02B 2006/12097* (2013.01); *G02B 2006/12159* (2013.01)

(58) Field of Classification Search
USPC .......................................................... 385/129
See application file for complete search history.

(56) References Cited

U.S. PATENT DOCUMENTS

2013/0294722 A1* 11/2013 Vuckovic et al. ............... 385/14

* cited by examiner

*Primary Examiner* — Uyen Chau N Le
*Assistant Examiner* — Hoang Tran
(74) *Attorney, Agent, or Firm* — Lumen Patent Firm

(57) ABSTRACT

A 1D nanobeam photonic crystal cavity is provided that includes a substrate, where the substrate includes a dielectric medium, and a series of cutout features in the substrate, where each cutout feature includes a first curved surface and a second curved surface, where the first curved surface and the second curved surface form a meniscus shape, where the series of cutout features include an array of sizes of the meniscus shape cutouts, where edges of the meniscus shape and the array of sizes are disposed to form a pair of opposing parabolic dips proximal to a central region of the series of cutout features.

5 Claims, 6 Drawing Sheets

CONFOCAL AND CONCAVE 1D PHOTONIC CRYSTAL RESONANT CAVITIES WITH ULTRA-LOW MODE VOLUME

CROSS-REFERENCE TO RELATED APPLICATIONS

This application claims priority from U.S. Provisional Patent Application 61/779,338 filed Mar. 13, 2013, which is incorporated herein by reference.

FIELD OF THE INVENTION

The current invention relates to photonic crystal cavities. More particularly, the current invention relates to 1D nanobeam photonic crystal cavity structures that are capable of operating at relatively high Q factors in dielectric mediums but with a ultralow mode volume.

BACKGROUND OF THE INVENTION

The design of photonic crystal cavities takes inspiration from the periodic nature of atomic crystals and the effect on energy bands with allowed and disallowed states and uses the same framework to understand what happens if there is periodicity in refractive index. The effect of this periodicity is well known through the Bragg stack, which has been used to make mirrors out of dielectric materials. Bragg stacks are designed with the boundary condition that the Fresnel reflection at each interface of alternating high and low refractive index materials occurs at such distances that the fields interfere constructively towards the incident side of the stack thus maximizing reflection. It is possible to use transfer matrix methods to evaluate an expression relating the incident and the transmitted field and thus predict reflectance and transmission from such stacks. The spectral range where Bragg stacks are highly reflecting is called the stop band and is the photonic equivalent of an electronic bandgap. However the photonic bandgap in Bragg stacks is incomplete and only valid for TE fields and not for TM fields. 2D and 3D photonic crystals i.e. refractive index periodicity in 2 and 3 dimensions on the other hand can have complete bandgap.

These cavities are useful for studying light matter interaction in the two regimes of strong and weak coupling. In the strong coupling regime phenomena like Rabi Oscillations can be demonstrated and in the weak coupling regime effects like Purcell enhancement can be observed. In recent years interest in photonic crystal cavities has evolved from mere tools for studying fundamental phenomena such as the Purcell enhancement or Rabi oscillations, to use in actual optoelectronic devices such as electronically pumped lasers or pressure and chemical sensors. The fundamental benefit of the photonic crystal cavities is the use of dielectric materials which are mainly non lossy. This property allows for high quality factor cavities with reported figures as high as $10^6$, which has not been possible with metallic cavities.

2D photonic and 1D photonic crystal cavities incorporating silicon nanocrystals have been demonstrated. However the designs of such cavities have not been provided for the material properties of silicon nanocrystals. It was shown that 1D nanobeam cavities are possible with quality factors as high as 25000 and mode volumes as low as $1.1(\lambda/n)^3$ using silicon rich oxide which has a refractive index of only n~1.7, while others have studied 2D photonic crystals and showed Q factors of 300 with mode volume of $0.78(\lambda/n)^3$.

Vertical cavity surface emitting lasers (VCSELs) have been the dominant 1D cavity structure but more recently the horizontal nanobeam has become of interest as well. The nanobeam is a free-standing structure with periodic air holes serving as the low index material. An early prior art design of such structure is shown in FIG. 1 made in silicon. The periodicity of refractive index results in a stop band but in order to create a resonant mode, a defect must be introduced in this periodicity thus forming allowed photon states. Usually the defects are either a change in periodicity or size of an element and determine the allowed photon density of states, which is relevant for the strength of the light matter interaction. In this early design the defect was created by changing the period in the cavity center thus allowing a resonance with a quality factor of 280 at 1547 nm.

The condition for high reflection in a Bragg stack is:

$$a = \lambda/4n_1 + \lambda/4n_2 \tag{1}$$

$$an_1 = an_2(n_1 + n_2) \tag{1a}$$

Here 'a' is the periodic spacing with materials of refractive index $n_1$ and $n_2$. Further, $a_{n1}$ is the thickness of the material with refractive index $n_1$. This is known as the quarter-wave stack as thickness of each material is equal to a quarter wavelength in that material. The estimated bandgap for the quarter-wave stack is given by:

$$\Delta\lambda = 4\lambda/\pi \arcsin(n_2 - n_1/n_2 + n_1) \tag{2}$$

It can be seen from equation (2) that a higher refractive index contrast i.e. $n_2 - n_1$ increases the bandgap. A high bandgap indicates a high inhibition of photons and is needed for ultrahigh quality factor cavities. This condition poses a problem for low refractive index materials like silicon rich oxide.

With the use of 1d nanobeam cavities high quality factors can be observed in low refractive materials. However for broad emitters like silicon nanocrystals or III-V compounds at room temperature what is needed is a 1d nanobeam photonic crystal cavity structure capable of relatively high quality factors with a ultra low mode volume.

SUMMARY OF THE INVENTION

To address the needs in the art, a 1D nanobeam photonic crystal cavity is provided that includes a substrate, where the substrate includes a dielectric medium, and a series of cutout features in the substrate, where each cutout feature includes a first curved surface and a second curved surface, where the first curved surface and the second curved surface form a meniscus shape, where the series of cutout features include an array of sizes of the meniscus shape cutouts, where edges the array of sizes are disposed to form a pair of opposing parabolic dips proximal to a central region of the series of cutout features.

According to one aspect of the invention, the substrate is a material such as, silica, silicon nitride, galium arsenside, indium galium arsenide, or germanium.

In another aspect of the invention, the meniscus shape is can include a shape such as concave, confocal or convex.

In a further aspect of the invention, end features of the array include an aspect ratio of 2 a to a between the substrate and the cutout features, where 2 a is a thickness along an x-axis of the substrate and the a is a periodic separation of the cutout features along a z-axis of the substrate. In one aspect, the period a comprises a quarter wave Bragg stack value.

DETAILED DESCRIPTION

Figure 1:
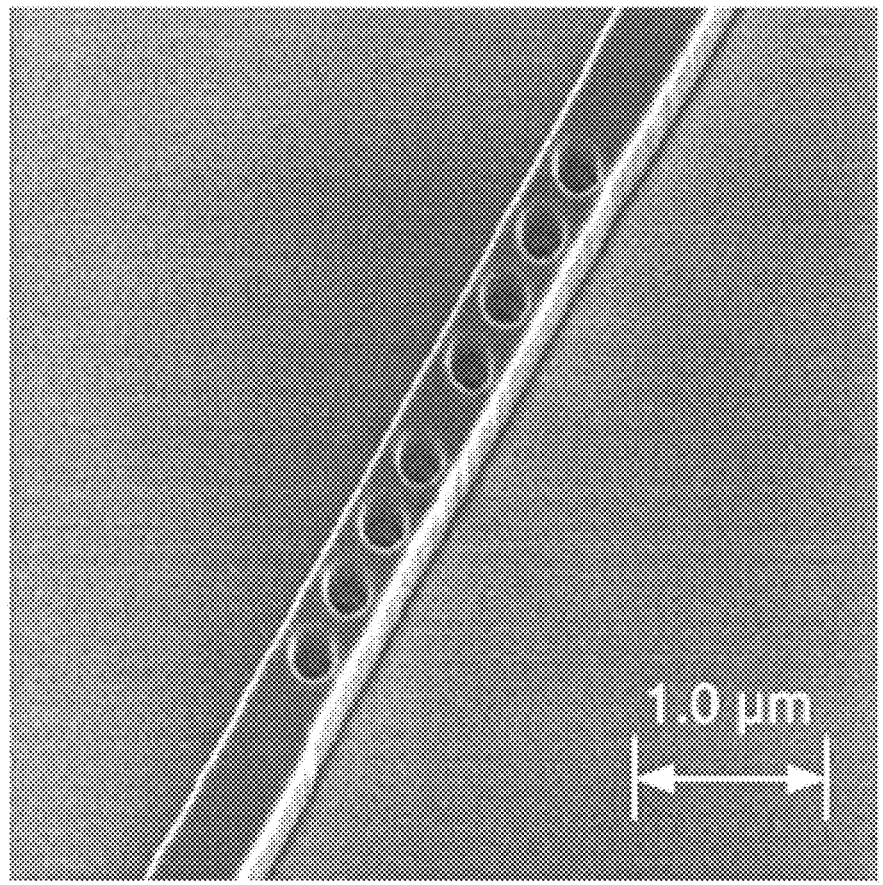
FIG. 1 shows a prior art nanobeam free standing structure with periodic air holes serving as the low index material.
Figure 2:
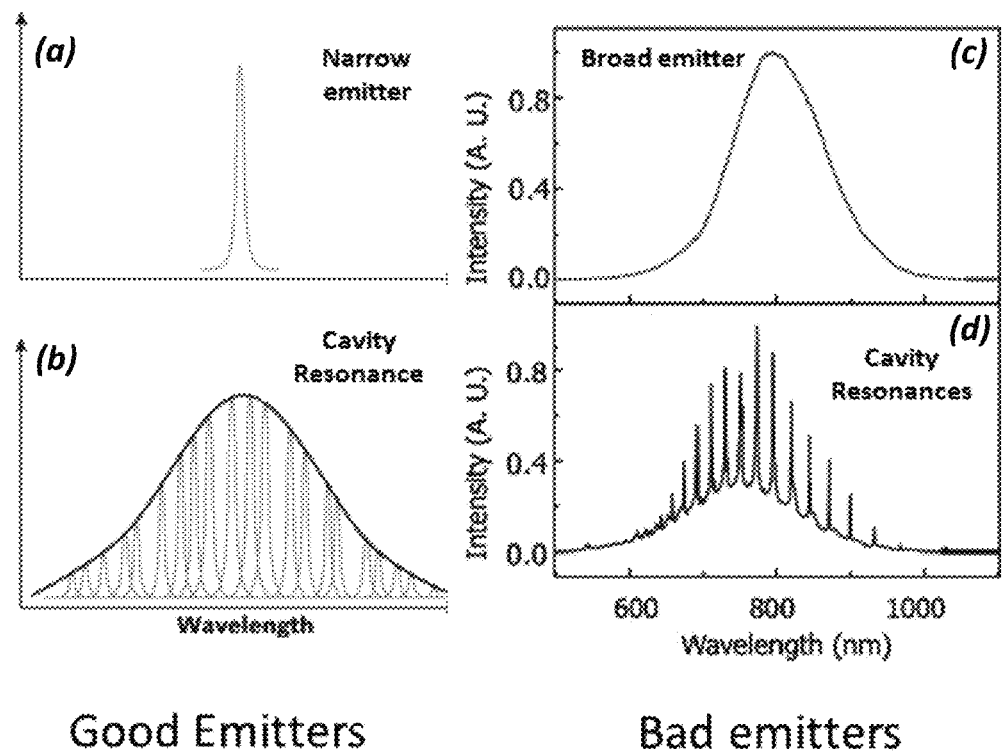
FIGS. 2a-2d show good and bad emitters coupling into cavity modes, where good emitters are narrow enough to fit multiple emitter linewidths into a single cavity mode, and a bad emitter can span multiple cavity resonances, according to the current invention.

The current invention includes nanoscale scale devices and methods that shape the periodicity in a photonic crystal cavity affecting the Q factor and mode volume. In one example, devices with the confocal, concave and flat hole designs onto a 1D nanobeam structure in silicon rich oxide are provided. The highest obtained Q factor was greater than 35000 while the lowest mode volume obtained was 0.3 $(\lambda/n)^3$, which is more than 3 folds lower than previous results. The hole shapes also affect the mode shape and allowed the reduction of mode volumes below any previous report for silicon rich oxide.

One of the advantages of this invention is that it provides lower mode volume over other designs, while maintaining the field maxima in high index material. Thus making it possible to create lasers out of poor emitting materials or increase light matter interaction. Electronic or biological materials that are widely used, but have poor emissive properties, benefit from such design.

Embodiments of the invention can be used in applications to increase light matter interaction using recirculation of light in an optical cavity for sensors or light sources like LEDS and Lasers. The optical properties of these cavities make them particularly suited for less efficient emitters.

The resonant cavities of the current invention improve the gain in low gain materials allowing the possibility of lasing and reduction in lasing threshold. Devices according to the invention have been fabricated and show high Q factors even in materials with low index contrast like glass. These devices also have the potential to allow the fabrication of Si-based lasers in an all CMOS-compatible and scalable process.

When designing photonic crystal cavities for lasers or LEDs, the objective is usually to increase the spontaneous emission rate through cavity quantum electrodynamics. This increase in the spontaneous emission rate is known as Purcell Enhancement predicted in the 1940s, and occurs due to coupling of a dipole emitter and its electronic states to the cavity-controlled photon DOS. Purcell Enhancement is thus a modification of a fundamental property of an emitter that is its spontaneous emission decay rate and can improve the threshold and efficiency characteristics of a LED or laser. When dealing with narrow emitters such that the emitter linewidth is narrower than the cavity resonance, one gets the ideal Purcell enhancement:

$$Fc = 3 4 \pi 2 (\lambda n) 3 Q V \text{mode} \quad (3)$$

$$V\text{mode} = \in rEr2d3r\max[\in rEr2] \quad (4)$$

This formula shows that the factor $Q/V_{mode}$ must be maximized. However this definition does not account for the need of a spatial and spectral overlap between the emitter and the electromagnetic field pattern. Thus in the context of laser cavities good emitters are defined as having $\Delta\omega_e \ll \Delta\omega_{cav}$ (FIGS. 2a-2d) i.e. good spectral overlap. Spatial overlap is dependent on the position of the emitter with respect to the mode maxima. FIGS. 2a-2d show good and bad emitters coupling into cavity modes, where good emitters are narrow enough to fit multiple emitter linewidths into a single cavity mode, and a bad emitter can span multiple cavity resonances.

Silicon nanocrystals, due to their indirect gap, have broad linewidths of around 150 meV at room temperature and thus are considered "bad" emitters and as a result they do not show large Purcell enhancements. While direct gap quantum dots like InGaAs/GaAs turn into narrower and more efficient emitters at low temperature, Si-NCs, which mainly exhibit a phonon-assisted recombination process, on the other hand start to show slower emission decay rates as the density of phonons drops. The highest QE for Si-NCs is observed at T=100K at which point the emitter linewidth is still broad and approximately 50 meV.

Another material property that is of relevance is the estimated gain in Si-NCs, which is about 50 cm$^{-1}$, while losses associated with FCA, Auger and the solid matrix (SRO) are closer to 350 cm$^{-1}$. This means that in order to observe lasing in Si-NCs at least a factor 7 Purcell enhancement is needed to overcome the losses. The non-ideal Purcell enhancement is given by:

$$FC = 3 \lambda 3 4 \pi 2 1 V\text{mode}(1 Q\text{cav} + \Delta\omega e\omega e) - 1 \quad (5)$$

Figure 3:
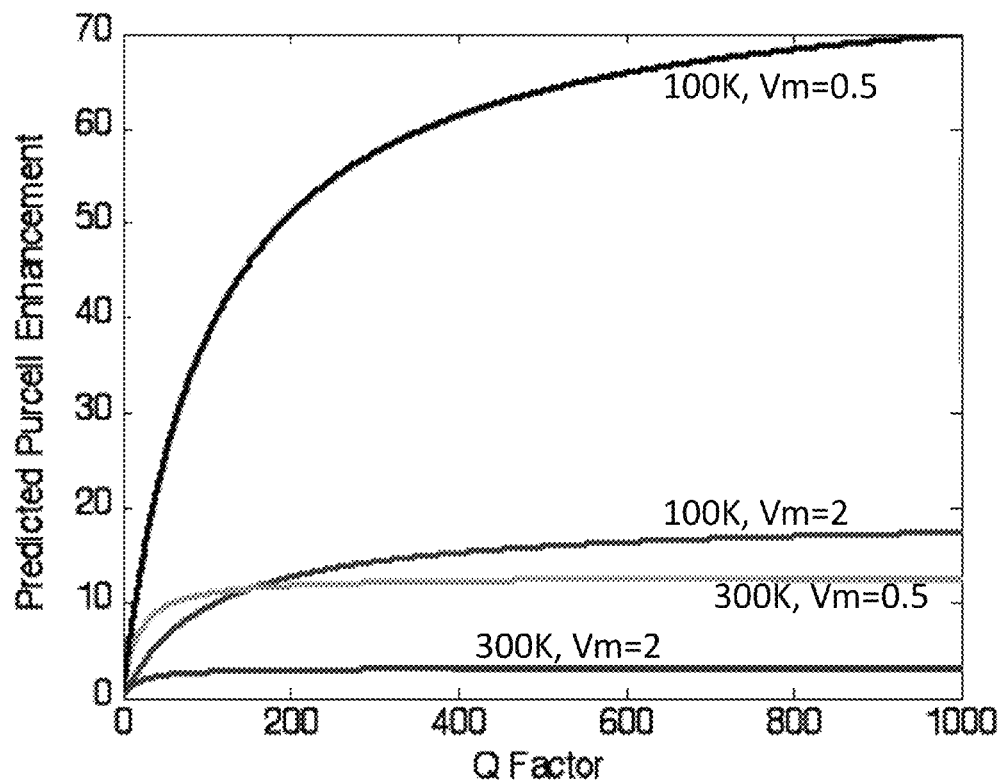
FIG. 3 shows the Purcell enhancement for room temperature and 100K linewidths with two different mode volumes of $2(\lambda/n)^3$ and $0.5(\lambda/n)^3$.

Here $\Delta\omega e$ is the emitter linewidth. Using this formula the estimated Purcell enhancement can be calculated in the case of broad emitters as the quality factor changes, the only assumption here is that the spatial overlap between the emitter and the field is perfect. The spatial overlap is maximum when the emitter is physically placed at the field maxima, which is usually the center of the cavity. An estimate of tolerable displacement for close to perfect overlap can be obtained by measuring the full width half maxima distances of the peak field in the cavity mode. FIG. 3 shows the Purcell enhancement for room temperature and 100K linewidths with two different mode volumes of $2(\lambda/n)^3$ and $0.5(\lambda/n)^3$. It can be seen that beyond a Q of 1000 there is no further benefit for the Purcell enhancement increase. For the cavities with mode volume of 2 it is seen that the enhancement peaks at around 8, while at room temperature is it only 3. However with small mode volumes and low temperatures it should be possible get an enhancement of as high as 40. In FIG. 3, Purcell enhancement is shown as a function of Q and for different mode volumes calculated using equation (5) and using the experimentally obtained individual Si-NC linewidths at room temperature (~150 meV) and at 100K (~30 meV).

Given FIG. 3 the Q/V metric is not as relevant in Si-NCs as direct gap emitters and the quality factor of a cavity may be sacrificed if the mode volume can be reduced. The current record mode volume for cavities in SRO is $1.1(\lambda/n)^3$.

For large laser cavities, the beam stability is part of the design consideration. Over multiple passes in a cavity the beam may drift and in order to compensate for such drift linear cavities are either confocal or concave-convex amongst other geometries. The current invention brings onto the 1D nanobeam cavities curved holes forming confocal, convex and concave 1D nanobeam cavities.

Figure 4:
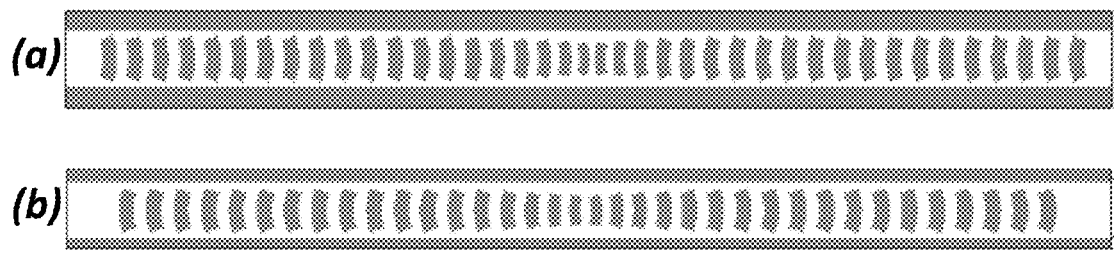
FIGS. 4a-4b show top down views of a concave cavity and a confocal cavity refractive index cross section, according to embodiments of the current invention.
Figure 5:
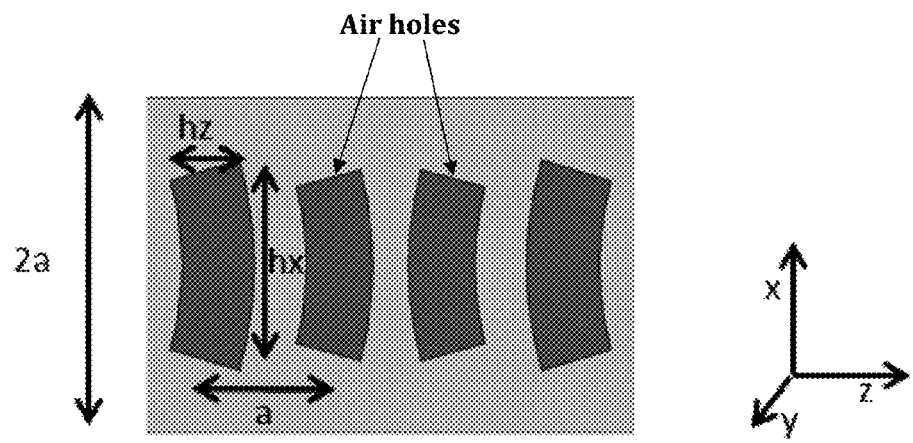
FIG. 5 shows feature sizes of a concave cavity, according to one embodiment of the invention.

FIGS. 4a-4b show top down views of a concave cavity and a confocal cavity refractive index cross section. FIG. 5 shows feature sizes of a concave cavity, according to one embodiment of the invention.

An in-house 3d FDTD simulation code in Matlab was used for simulating cavity geometries and optimizing the defects in the cavities. 20 nodes of perfectly matched layers (PML) were used as an absorbing boundary condition. It has been shown that by spreading the defect over multiple lattice spacing one can get very high quality factors due to a gentler matching of the field patterns to the waveguide mode of the nanobeam. A linear dip in lattice parameter and hole size in $SiN_4$ cavities has been shown, while a parabolic dip in periodicity has been used with flat holes of the same size. The current invention uses a parabolic defect structure and scales both the hole size and lattice parameter. In order to optimize the dip, the transmission coefficient was studied as the to dip was modified over 7 periods on each side of the cavity. The lattice parameter was obtained from the Bragg condition for a stop band central wavelength of 600 nm. Since electromagnetic structures are scalable, the same design can be applied to any wavelength requirement. The total number of periods on each side is 20, in this example, where an upper bound can be has high as 60 or more. While the quarter wave stack in the case of SRO and air would dictate air holes of 0.64 a, such large ratio of air to SRO is mechanically problematic as well as hard to fabricate so we use air hole width of hz=0.54 a with a height of hx=0.7×beam width. Both the height and the width scaled with the parabolic dip defect. It has been shown that if the width of the nanobeam is made narrower than 2.4 a, the quality factor starts to drop below 25000, however given the importance of a low mode volume over a higher Q, the design began with a width of 2 a. The radius of curvature for the hole elements was also kept at 2 a for both the confocal and the concave cavities while the thickness of the beam was set to 'a'. For a central wavelength of 600 nm 'a' was 176 nm.

Figure 6:
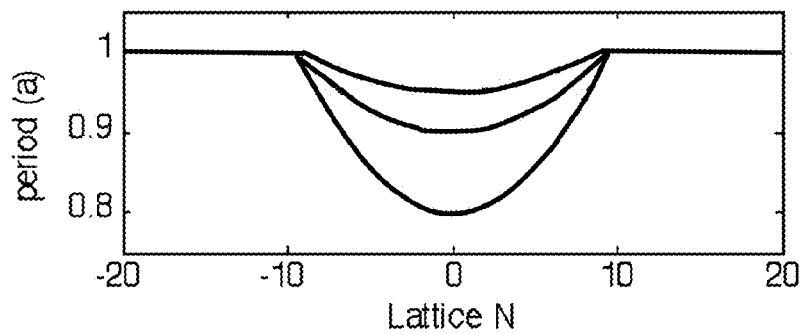
FIG. 6 shows simulations preformed through a dip depth range of 0.94 a to 0.72 a, where the cavity is located at N=0, according to embodiments of the current invention.

Simulations were preformed through the dip depth range of 0.94 a to 0.72 a as shown in FIG. 6. Here, it was found that the stop band is broad and offers over −30 dB suppression from $0.9\lambda$ to $1.1\lambda$. This bandwidth improves as the parabolic dip is made deeper and at 0.74 a it was observed that a broad stop band as well as a sharp feature at 600 nm with −60 dB suppression exist. By aligning a mode with this sharp feature high reflection and maximization of the quality factor of the resonance are possible. The same feature appears for the concave and confocal cavities.

Figure 7:
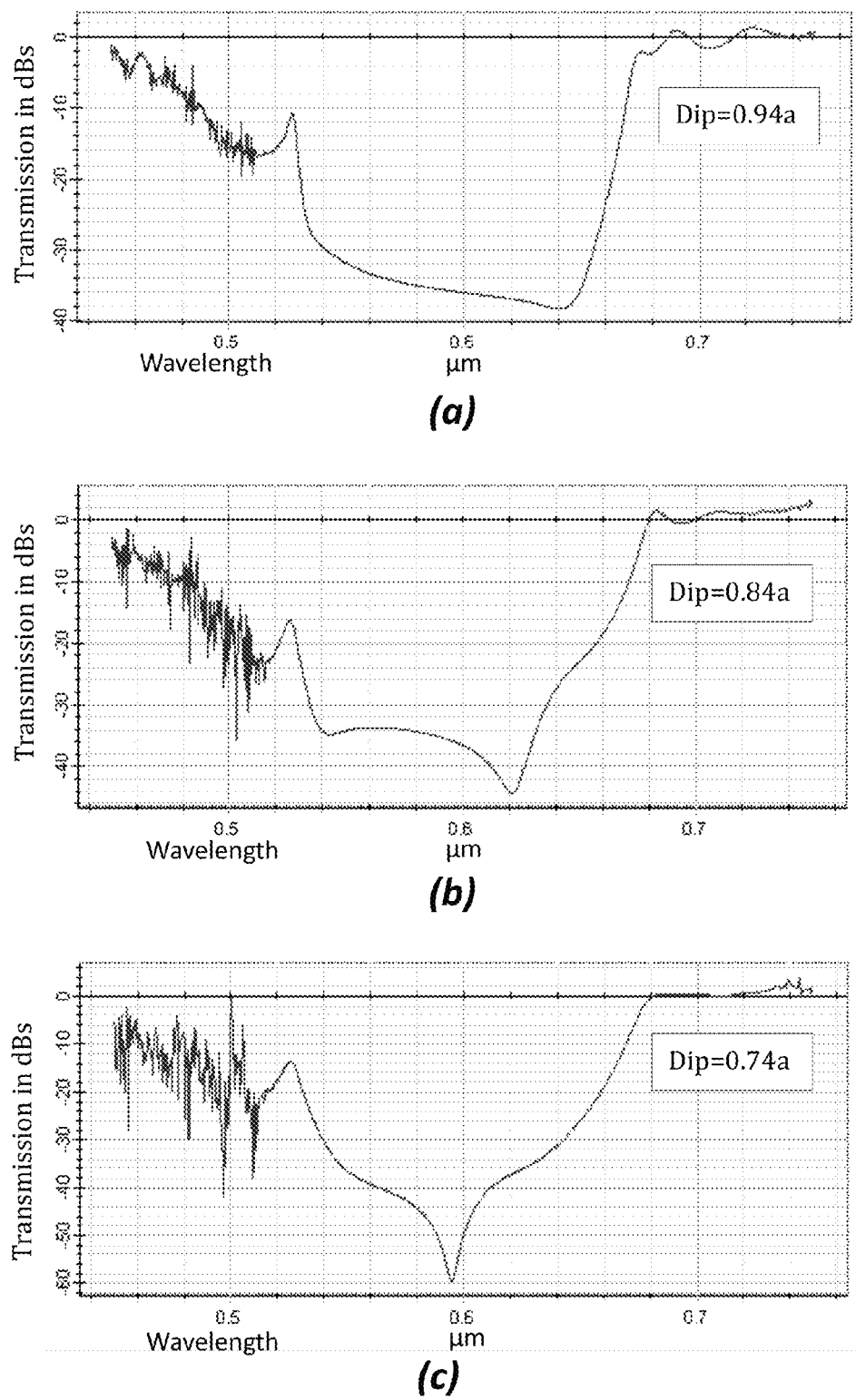
FIGS. 7a-7c show transmission spectra of 20 periods of concave/concave bragg stack in SRO as the parabolic dip depth is increased from 0.94 a to 0.74 a, according to embodiments of the current invention.

The sharp minimum in the transmission spectra is due to the matching of the field profile in the forward and backward direction and thus is dependent on the shape of the waveguide mode which changes with beam width and height. After optimizing the dip and setting it to a value of 0.74 a in order to optimize the quality factor of the cavity, the distance between the two central holes was varied by small amounts, which shifted the modes. The modes of the two cavities shifted as shown in FIGS. 7a-7c. The lowest order TE like mode is at shorter wavelength for the concave cavities vs. confocal cavities in the range of cavity lengths that we studied and varies from $0.84\lambda_0$ to $0.86\lambda_0$. The confocal cavity mode shifts from $0.86\lambda_0$ to $0.88\lambda_0$. The $2^{nd}$ mode is close to the center of the stop band and the design wavelength $\lambda_0$. In order to resolve the small steps in cavity length, a mesh size of 3 nm was used in the z direction while x and y were meshed at 15 nm.

Figure 8:
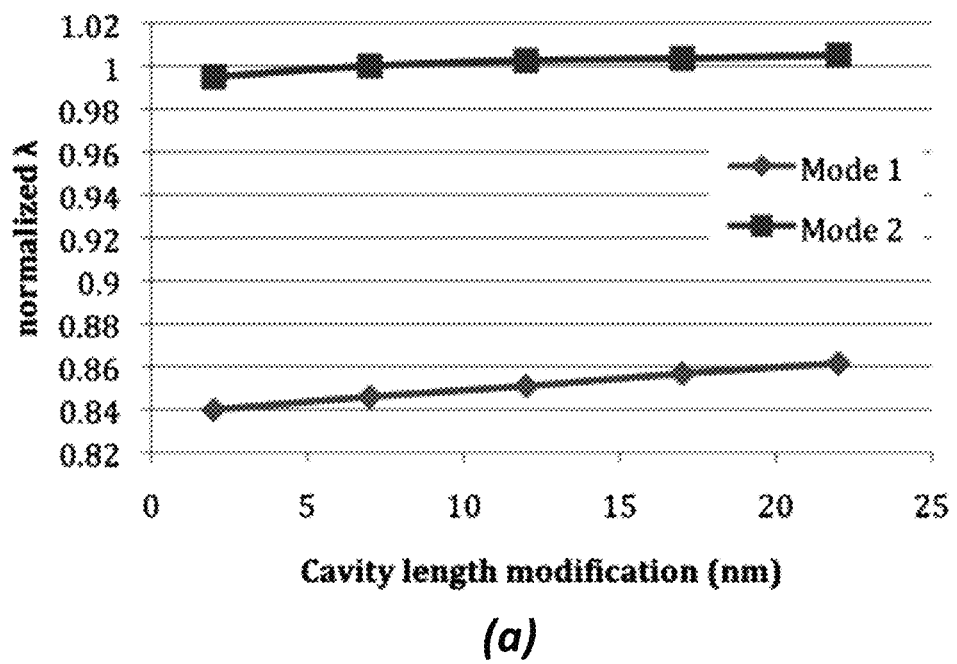
FIGS. 8a-8b show a normalized position of the lowest TE-like mode in concave cavities as the cavity length is slightly modified, and normalized position of the lowest TE-like mode in confocal cavities as the cavity length is slightly modified according to embodiments of the current invention.
Figure 8:
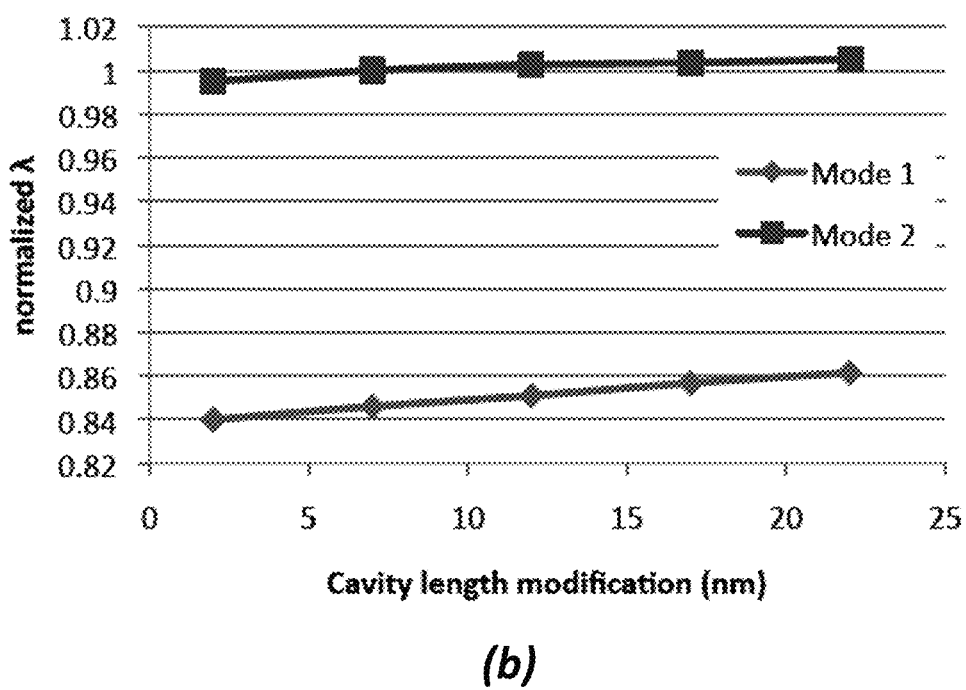

FIGS. 8a-8b show a normalized position of the lowest TE-like mode in concave cavities as the cavity length is slightly modified, and normalized position of the lowest TE-like mode in confocal cavities as the cavity length is slightly modified according to embodiments of the current invention. While it is expected that as the cavity length is made shorter the modes will move to shorter wavelengths, the comparison between the concave and confocal cavities shows that the gap between the holes in the middle of the beam determines the mode wavelength more strongly than at the edges. This conclusion can be drawn because the concave cavity displays a shorter distance between the holes in the center than at the edges in contrast with the confocal cavity which displays a shorter distance at the sides, see FIG. 8b. Hence, the concave cavity has the lowest TE modes at shorter wavelengths; near the optimal Q.

For these two cavities it was observed that the complete field in 3D and at individual nodes on the end of the beam, the center of the beam and on the side of the beam. The quality factor was obtained by measuring the resonance linewidths as well as the field decay rate from the cavity and both measurements were consistent. The mode volume was calculated by using the Fourier components of the combined Ex, Ey and Ez fields at the resonance and employing equation (4). In order to test the stability of the results the x and y mesh sizes were varied by small amounts; these variations introduced no large changes in the Q factor or mode positions.

The feature sizes for confocal cavity with resonance at 700 nm are a=327 nm hz=177 nm and hx=458 nm with beam width and hole radius of curvature of 654 nm. These features are well within the capabilities of modern resists like ZEP520a or PMMA as well as electron beam lithography tools available in the art.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example a combination of flat and concave holes or a combination of flat and convex holes or a combination of convex and concave holes or a combination of round and convex holes or a combination of round and concave holes and any other such interchanges.

All such variations are considered to be within the scope and spirit of the present invention as defined by the following claims and their legal equivalents.

What is claimed:

1. A 1D nanobeam photonic crystal cavity comprising:
   a) a substrate, wherein said substrate comprises a dielectric medium; and
   b) a series of cutout features in said substrate, where each said cutout feature comprises a first curved surface and a second curve surface, wherein said first curved surface and said second curve surface form a meniscus shape, wherein said series of cutout features comprises an array of sizes of said meniscus shape cutouts, wherein edges of said array of sizes are disposed to form a pair of opposing parabolic dips proximal to a central region of said series of cutouts features.

2. The 1D nanobeam cavity of claim 1, wherein said substrate comprises a material selected from the group consisting of, silica, silicon nitride, galium arsenside, indium galium arsenside, and germanium.

3. The 1D nanobeam cavity of claim 1, wherein said meniscus shape is selected from the group consisting of concave, confocal and convex.

4. The 1D nanobeam cavity of claim 1, wherein end features of said array comprise an aspect ratio of 2 a to a between said substrate and said cutout features, wherein said 2 a is a thickness along an x-axis of said substrate and said a is a periodic separation of said cutout features along a z-axis of said substrate.

5. The 1D nanobeam cavity of claim 4, wherein said period a comprises a quarter wave Bragg stack value.

\* \* \* \* \*